United States Patent [19]

Mancinelli et al.

[11] 4,046,098
[45] Sept. 6, 1977

[54] ROTATABLE MULTI-SURFACE REFLECTORS FOR BICYCLES

[76] Inventors: Ralph A. Mancinelli, 23025 Hayes St., East Detroit, Mich. 48021; Anthony R. Mancinelli, 39330 Donahue Drive, Mount Clemens, Mich. 48043

[21] Appl. No.: 696,844

[22] Filed: June 17, 1976

[51] Int. Cl.$^2$ .............................................. B60Q 1/30
[52] U.S. Cl. ........................................ 116/56; 350/99
[58] Field of Search ...................... 350/97, 99; 116/56, 116/28 R; 73/527; 74/12, 13

[56] References Cited
U.S. PATENT DOCUMENTS

| | | | |
|---|---|---|---|
| 2,120,578 | 6/1938 | Schulze | 74/12 |
| 3,528,721 | 9/1970 | LaLonde | 350/99 |
| 3,626,766 | 12/1971 | Waldecker | 74/12 |
| 3,938,395 | 2/1976 | Henecke | 74/12 |

Primary Examiner—S. Clement Swisher
Assistant Examiner—Denis E. Corr
Attorney, Agent, or Firm—Clarence A. O'Brien; Harvey B. Jacobson

[57] ABSTRACT

A rotatable multi-surface reflector for bicycles has a reflector assembly mounted on a bicycle and connected to a transmission which moves the reflector assembly as a function of the angular speed of a wheel on which the transmission is mounted. The reflector assembly includes a mechanism connected to the transmission for converting the circular motion received from the transmission into an irregular motion so as to cause the reflector assembly to provide a flashing effect when light is impinging on reflection surfaces provided in the reflector assembly.

9 Claims, 9 Drawing Figures

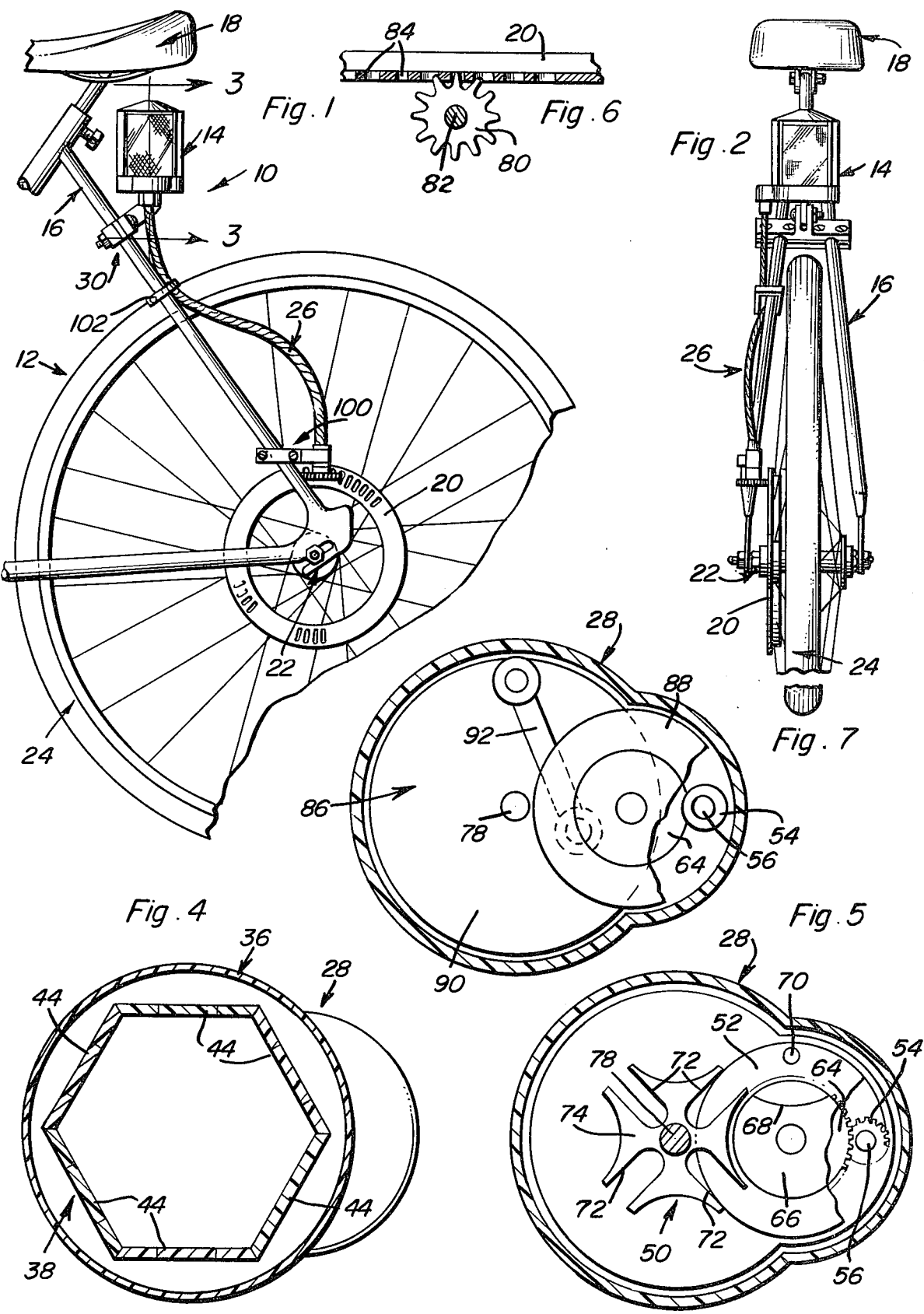

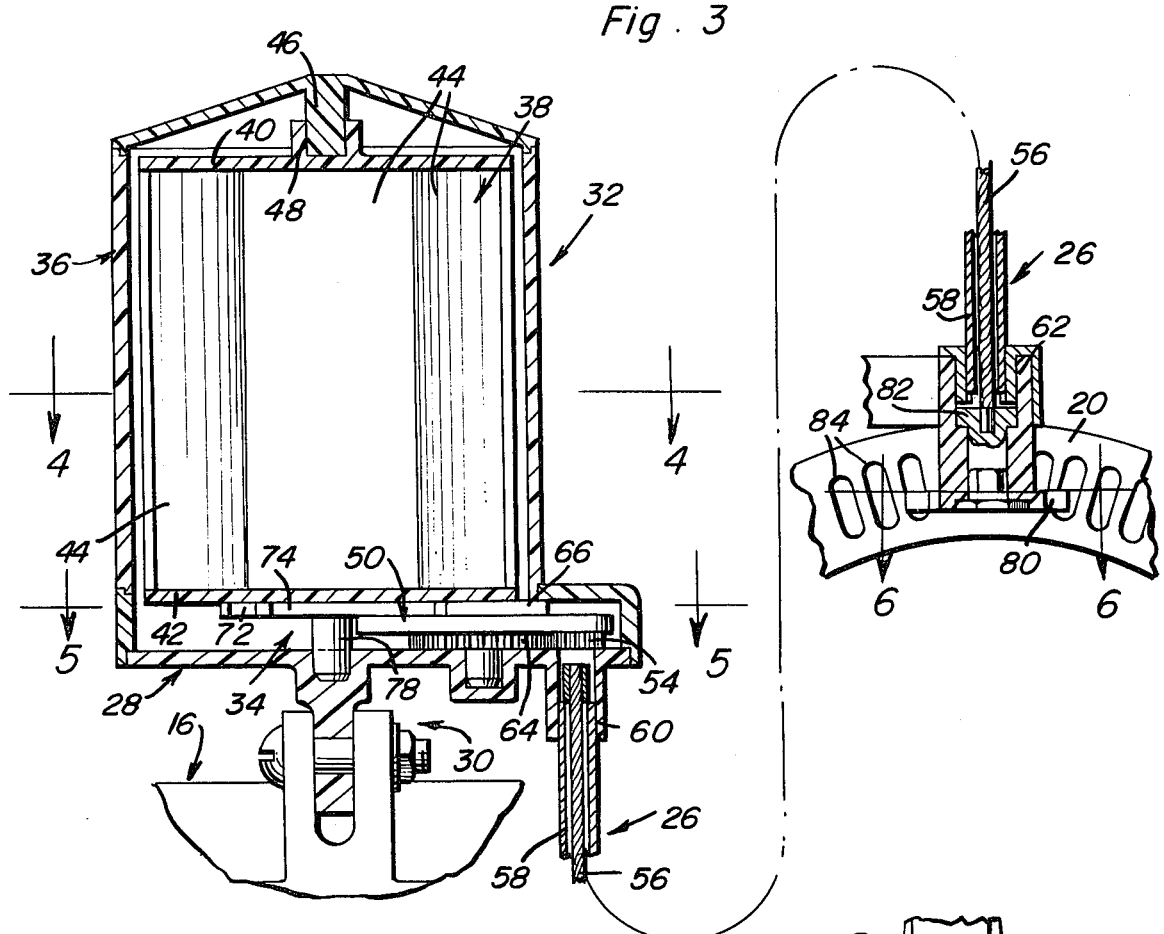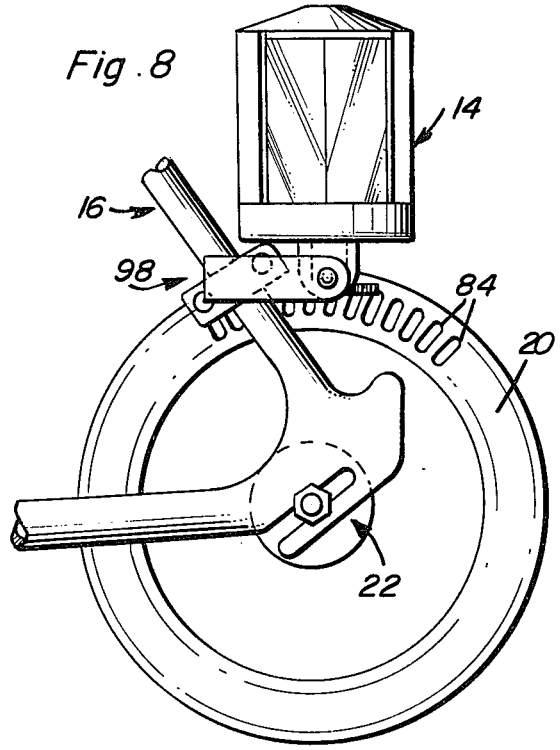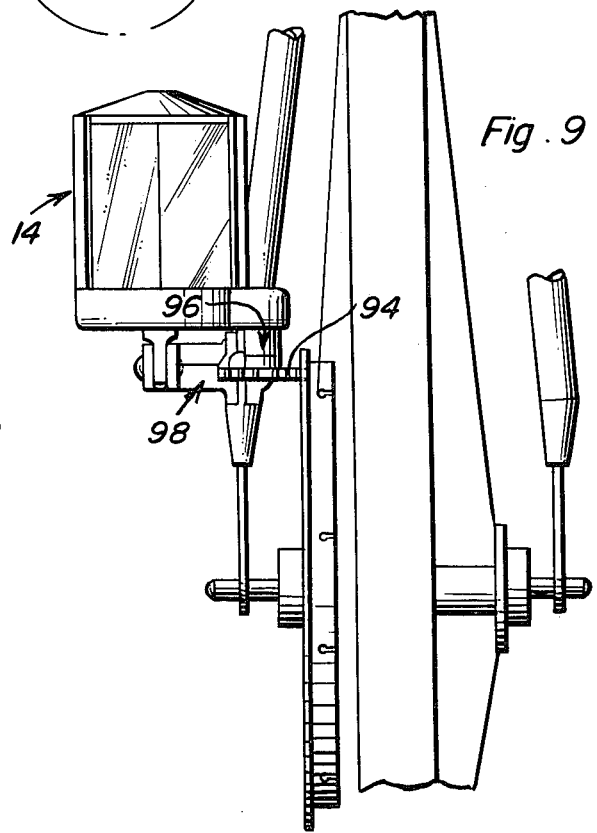

4,046,098

ROTATABLE MULTI-SURFACE REFLECTORS FOR BICYCLES

BACKGROUND OF THE INVENTION

1. Field of the Invention

This invention relates generally to a reflector for bicycles and similar vehicles, and particularly to a multi-surface reflector which appears to be flashing due to movement of a plurality of reflector surfaces relative to a predetermined observation point or points of reference.

2. Description of the Prior Art

It is generally known to provide bicycles and similar vehicles with reflector devices which have a reflecting surface movable with respect to the frame of reference of the bicycle in order to create a flashing effect when the reflecting surface is viewed from a point outside of the frame of reference of the bicycle. U.S. Pat. Nos. 3,478,713, issued Nov. 18, 1969 to B. L. Brames; 3,528,721, issued Sept. 15, 1970 to F. J. LaLonde; and 2,741,948, issued Apr. 17, 1956 to G. D. Parker; disclose various examples of bicycle reflectors. More specifically, U.S. Pat. No. 2,741,948 discloses a device which is driven from the spokes of a wheel of a bicycle, while U.S. Pat. No. 3,478,713 discloses a device which is driven by frictional contact with the side of a tire of the bicycle. U.S. Pat. No. 3,528,721 further discloses a device which is driven by frictional contact with the periphery of a tire of the bicycle.

In addition, it is also known to provide reflecting devices which are rotated by wind or similar forces, an example of which can be found in U.S. Pat. No. 3,292,569, issued Dec. 20, 1966 to G. T. Trigilio. It is also known to rotate a reflector by means of a suitable electrical or other motor, as can be found in U.S. Pat. No. 3,633,161, issued Jan. 4, 1972 to C. W. Price.

SUMMARY OF THE INVENTION

It is an object of the present invention to provide a reflector for bicycles and similar vehicles which is positively driven in a simple yet reliable manner.

It is another object of the present invention to provide a bicycle reflector which is positively driven by rotation of a rear wheel, or the like, of a bicycle.

It is yet another object of the present invention to provide a bicycle reflector which can be mounted in such a manner as to be arranged close in to the frame of the bicycle so as to be protected from damage during mishaps involving the bicycle.

It is a still further object of the present invention to provide a bicycle reflector which employs a multi-surface reflector element arranged for irregular movement relative to the reflector per se in order to create a flashing effect for the reflector.

These and other objects are achieved according to the present invention by providing a rotatable multi-surface reflector having: a rotatable reflector assembly mounted on a vehicle; a transmission mounted on a wheel of the vehicle for moving the reflector assembly as a function of an angular speed of the wheel; and a connecting arrangement attached to the reflector assembly and to the transmission for operably connecting the transmission to the assembly.

Preferably, the transmission includes a ring gear mounted on the spokes of the wheel of the vehicle for rotation coaxially with the wheel. The connecting arrangement can take one of at least two forms depending upon the disposition of the reflector assembly on the vehicle. If the reflector assembly is mounted on the frame of a bicycle directly behind the seat of the bicycle, a flexible drive shaft forms the connecting arrangement, while in the event the reflector assembly is mounted on the frame of a bicycle directly adjacent the hub of the, for example, rear wheel of the bicycle, a rigid shaft assembly can be employed as a coupling between the ring gear and the reflector assembly.

The reflector assembly advantageously includes a base having affixed thereto a bracket which attaches the base to the frame of a bicycle, and the like. A reflector element is rotatably mounted on the base, with a converter device being mounted on the base and connected to the connecting arrangement and to the reflector element for imparting an irregular motion to the reflector element. According to one preferred embodiment of the invention, the converter means includes a Geneva mechanism arranged for converting the circular motion transmitted from the wheel of the vehicle into an intermittent uni-directional motion. Conversely, another preferred embodiment of the present invention provides for a crank and rocker four link mechanism which imparts an oscillating motion to the reflector element.

The reflector element advantageously includes a transparent enclosure mounted on a base of the reflector assembly, in which the converter arrangement is housed, and a hollow prism having a pair of parallel end faces and at least three side faces, the prism supported by the converter arrangement and journaled on and disposed within the enclosure. The prism is constructed from reflective material, with each side face of the prism advantageously being provided with a different color in order to enhance the flashing effect obtained by the reflector assembly.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, side elevational view showing a preferred embodiment of a bicycle reflector according to the present invention mounted immediately behind the seat of a bicycle.

FIG. 2 is a fragmentary, rear elevational view showing the bicycle reflector arrangement set forth in FIG. 1. FIG. 3 is an enlarged, fragmentary, sectional view taken generally along the line 3—3 of FIG. 1.

FIG. 4 is a sectional view taken generally along the line 4—4 of FIG. 3.

FIG. 5 is a sectional view, partly broken away for clarity, taken generally along the line 5—5 of FIG. 3.

FIG. 6 is a fragmentary, perspective view taken generally along the line 6—6 of FIG. 3.

FIG. 7 is a sectional view, partly broken away for clarity, similar to FIG. 5, but showing another embodiment of the present invention.

FIG. 8 is a fragmentary, side elevational view showing still another embodiment of a bicycle reflector according to the present invention.

FIG. 9 is a fragmentary, rear elevational view showing the embodiment of FIG. 8.

DESCRIPTION OF THE PREFERRED EMBODIMENTS

A rotatable multi-surface reflector 10 for bicycles, and the like, is shown mounted on the rear portion of a conventional bicycle 12. This reflector 10 includes a rotatable reflector assembly 14 mounted on frame 16 of bicycle 12 immediately behind the seat 18 of the bicycle. A transmission including a ring gear 20 rotatable coaxially with a hub 22 and mounted on the spokes of the rear wheel 24 of bicycle 12 as by the illustrated radially slotted stiffener ring provided on the back of gear 20 for moving reflector assembly 14 as a function of an angular speed of wheel 24. A flex drive shaft 26 is illustrated in FIGS. 1 and 2 as attached to assembly 14 and ring gear 20 for operably connecting gear 20 to assembly 14.

Referring now more particularly to FIGS. 3 and 4 of the drawings, reflector assembly 14 includes a base 28 having attached thereto a bracket 30 for mounting base 28 on frame 16 of bicycle 12. A reflector arrangement 32 is rotatably mounted on base 28 as by means of a motion converter 34 also mounted on base 28 and connected to drive shaft 26 and reflector arrangement 32 for imparting an irregular motion to reflector arrangement 32.

A transparent enclosure 36 is mounted on base 28, and houses a hollow prism 38 having a pair of substantially parallel end faces 40 and 42 and at least three side faces 44. As illustrated, prism 38 is provided with six side faces 44. Prism 38 is supported by the motion converter 34 for movement therewith, and is journaled at the upper portion thereof, or adjacent face 40 to enclosure 36. More specifically, a projection 46 is provided at the uppermost portion of enclosure 36 which is received in a recess provided in a cup 48 formed on the upper surface of face 40.

Preferably, the side faces 44 are constructed from a suitable, known reflective material, with each side face 40 being provided with a different color in order to enhance the flashing effect of reflector arrangement 32, which flashing effect is obtained by means of the motion converter 34.

In the embodiment of the invention shown in FIGS. 1 through 4 of the drawings, motion converter 34 is in the form of a Geneva mechanism 50, which can be seen in FIG. 5. Mechanism 50 is arranged for imparting intermittent, continuous direction, motion to the reflector arrangement 32, and includes an actuating wheel 52 to which motion is imparted from a pinion 54 affixed to one free end of a line 56 (FIG. 3) which partially forms the flexible drive shaft 26. A sleeve 58 is arranged protectively surrounding the line 56 and extending from a fitting 60 disposed adjacent pinion 54 to a fitting 62 disposed adjacent the ring gear 20. Wheel 52 is provided with a gear 64 which meshes with pinion 54, and with a hub 66 disposed on a face of wheel 52 opposite to the face to which gear 64 is affixed and provided with an arcuate cutout 68 for permitting the step-by-step motion of mechanism 50 in a manner well known. A pin 70 is also provided on the surface of wheel 52 to which hub 66 is affixed, and this pin 70 intermittently engages in the slots 72 of a wheel 74 rotatably mounted on base 28. As can be seen from FIG. 3, a shaft 76 rotatably mounts wheel 52 on base 28, while a shaft 78, like shaft 76 received in an appropriate socket provided in base 28, rotatably mounts wheel 74. Since the operation of a Geneva mechanism such as that designated 50 is well known and commonly employed where intermittent uni-directional motion is desired, the operation of mechanism 50 will not be described in detail herein.

Referring now to FIG. 6 in conjunction with FIG. 3, it can be seen that a pinion 80 is mounted to the end of line 56 which is disposed adjacent the ring gear 20. A suitable coupling 82 secures line 56 to pinion 80 and the fitting 62 so that the teeth of pinion 80 can engage in the apertures 84 formed in ring gear 20 so that rotary movement of gear 20, which of course will be a function of rotation of wheel 24, will cause rotation of pinion 80, line 56, and pinion 54 in order to actuate the mechanism 50 and impart intermittent motion to the reflector arrangement 32, the end face 42 of which is affixed to wheel 74 of mechanism 50 in a suitable, known manner.

FIG. 7 of the drawings shows a modified embodiment of the present invention, inasmuch as the Geneva mechanism 50 is replaced by a crank and rocker four link mechanism 86 which will impart oscillating motion to the reflector arrangement 32. The crank of mechanism 86 is in the form of a wheel 88 connected to the ring gear 20 in a suitable manner, such as by the line 56 of a flexible drive shaft. The rocker is also in the form of a wheel 90 to which reflector arrangement 32 is affixed. By pivotally connecting the spaced ends of a connecting rod 92 to the wheels 88 and 90, mechanism 86 is formed in such a manner that rotation of wheel 88 will cause oscillating motion of wheel 90 about a shaft 78 in a known manner.

It will be appreciated that when the crank and rocker four link mechanism 86 of FIG. 7 is employed, the reflector arrangement is still advantageously constructed in the manner of arrangement 32, since even the oscillating motion imparted to the reflector arrangement by mechanism 86 will result in the side faces 44 being exposed to view from the sides and rear of a bicycle 12, or other suitable vehicle, during an oscillating cycle of the reflector arrangement.

Referring now more particularly to FIGS. 8 and 9 of the drawings, an embodiment of the invention is shown wherein the reflector assembly 14 is mounted immediately adjacent the hub 22 of a bicycle wheel so as to directly engage ring gear 20 as by a pinion 94 rigidly connected to reflector assembly 14 by a shaft assembly 96. In this embodiment of the invention, reflector assembly 14 is mounted on frame 16 of the bicycle at the, for example, rear wheel hub area thereof as by a suitable bracket 98 which is dissimilar from bracket 30, but is somewhat similar to the bracket 100 (FIG. 1) which is preferably provided with the embodiment shown in FIGS. 1 through 4 in order to assure that the flexible drive shaft 26 retains its proper position adjacent the hub 22, and does not flop into the, for example, spokes of the wheel 24.

A bracket 102 (FIG. 1) may also be provided in conjunction with drive shaft 26 for securing same relative to frame 16 and wheel 24.

As will be appreciated, the various embodiments of the invention described above are all formed around a basic reflector assembly 14 and transmission device such as formed by ring gear 20. Accordingly, a reflector 10 according to the present invention provides a versatile device for a bicycle or similar vehicle which can be mounted as appropriate to provide an easily identifiable reflector in a simple yet rugged and reliable manner.

For example, if an infant seat (not shown) is mounted behind the bicycle seat 18, the flexible drive shaft 26 can be appropriately moved to the back side of the infant seat by directing flexible shaft 26 accordingly. This would require only movement of the securing bracket 102, for example.

The side faces 44 of the reflector assembly may be constructed from suitable synthetic materials, and the like, commonly employed as reflectors, and may be of any suitable color such as red, amber, and the like, or from a combination of such colors.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A rotatable multi-surface reflector for bicycles, and similar vehicles, comprising, in combination:
   A. a rotatable reflector assembly mounted on a vehicle;
   B. transmission means mounted on a wheel of the vehicle for moving the reflector assembly as a function of an angular speed of the wheel; and
   C. connecting means attached to the reflector assembly and to the transmission means for operably connecting the transmission means to the reflector assembly; with the rotatable reflector assembly including, in combination:
      1. a base;
      2. bracket means attached to the base for mounting the base on the vehicle;
      3. reflector means rotatably mounted on the base; and
      4. motion converter means mounted on the base and connected to the connecting means and to the reflector means for imparting an irregular motion to the reflector means.

2. A structure as defined in claim 1, wherein the motion converter means includes a Geneva mechanism arranged for imparting intermittent motion to the reflector means.

3. A structure as defined in claim 1, wherein the motion converter means includes a crank and rocker four link mechanism arranged with the crank connected to the connecting means for rotation thereby, and the rocker affixed to the reflector means for oscillating the latter.

4. A structure as defined in claim 1, wherein the reflector means includes, in combination:
   a. a transparent enclosure mounted on the base; and
   b. a hollow prism having a pair of parallel end faces and at least three side faces, the prism being supported by the motion converter means and journaled on the enclosure, the prism being disposed within the enclosure and constructed from a reflective material, with each side face of the prism being provided with a different color.

5. A structure as defined in claim 4, wherein the motion converter means includes a Geneva mechanism arranged for imparting intermittent motion to the reflector means.

6. A structure as defined in claim 4, wherein the motion converter means includes a crank and rocker four link mechanism arranged with the crank connected to the connecting means for rotation thereby, and the rocker affixed to the reflector means for oscillating the latter.

7. A structure as defined in claim 4, wherein the transmission means includes a ring gear mounted on a hub of the wheel for rotation with the hub.

8. A structure as defined in claim 7, wherein the connecting means includes a flexible drive shaft having a pair of ends, one of the ends being connected to the reflector assembly, and a pinion connected to the other of the ends, with the pinion being arranged in engagement with the ring gear for being driven thereby.

9. A structure as defined in claim 7, wherein the connecting means includes a pinion rigidly connected to and supported by the reflector assembly and arranged in engagement with the ring gear, the reflector assembly being disposed directly adjacent a hub of the wheel of the vehicle, the ring gear being mounted on the hub.

* * * * *